US011911956B2

(12) United States Patent
Lund et al.

(10) Patent No.: US 11,911,956 B2
(45) Date of Patent: Feb. 27, 2024

(54) USING OCCLUDING FLUIDS TO AUGMENT ADDITIVE MANUFACTURING PROCESSES

(71) Applicant: Adaptive 3D Technologies, LLC, Dallas, TX (US)

(72) Inventors: Benjamin Robert Lund, Dallas, TX (US); Caleb Lund, Dallas, TX (US); Xun Han, Dallas, TX (US)

(73) Assignee: Adaptive 3D Technologies, Plano, TX (US)

( * ) Notice: Subject to any disclaimer, the term of this patent is extended or adjusted under 35 U.S.C. 154(b) by 266 days.

(21) Appl. No.: 17/295,218

(22) PCT Filed: Nov. 21, 2019

(86) PCT No.: PCT/US2019/062598
§ 371 (c)(1),
(2) Date: May 19, 2021

(87) PCT Pub. No.: WO2020/106949
PCT Pub. Date: May 28, 2020

(65) Prior Publication Data
US 2022/0010151 A1 Jan. 13, 2022

Related U.S. Application Data

(60) Provisional application No. 62/770,403, filed on Nov. 21, 2018.

(51) Int. Cl.
B29C 64/124 (2017.01)
B29C 64/129 (2017.01)
B29C 64/245 (2017.01)
B29C 64/264 (2017.01)
B29C 64/314 (2017.01)
B33Y 10/00 (2015.01)
B33Y 40/10 (2020.01)
B33Y 70/00 (2020.01)
C08G 18/38 (2006.01)
C09D 11/033 (2014.01)
C09D 11/037 (2014.01)
C09D 11/101 (2014.01)
C09D 11/102 (2014.01)
B29K 81/00 (2006.01)
B29K 105/00 (2006.01)
B33Y 30/00 (2015.01)

(52) U.S. Cl.
CPC .......... B29C 64/129 (2017.08); B29C 64/124 (2017.08); B29C 64/245 (2017.08); B29C 64/264 (2017.08); B29C 64/314 (2017.08); B33Y 10/00 (2014.12); B33Y 40/10 (2020.01); B33Y 70/00 (2014.12); C08G 18/3876 (2013.01); C09D 11/033 (2013.01); C09D 11/037 (2013.01); C09D 11/101 (2013.01); C09D 11/102 (2013.01); B29K 2081/00 (2013.01); B29K 2105/0002 (2013.01); B29K 2995/0088 (2013.01); B29K 2995/0093 (2013.01); B33Y 30/00 (2014.12)

(58) Field of Classification Search
None
See application file for complete search history.

(56) References Cited

U.S. PATENT DOCUMENTS

| | | | |
|---|---|---|---|
| 5,143,663 A * | 9/1992 | Leyden | B33Y 40/20 34/189 |
| 5,496,919 A | 3/1996 | Nakano | |
| 6,472,451 B2 | 10/2002 | Ha et al. | |
| 6,506,814 B2 | 1/2003 | Krongauz et al. | |
| 6,555,596 B1 | 4/2003 | Pourreau et al. | |
| 6,607,689 B1 | 8/2003 | Farnworth | |
| 7,060,762 B2 | 6/2006 | Schaedler et al. | |
| 7,893,127 B2 | 2/2011 | Nagvekar et al. | |
| 8,846,777 B2 | 9/2014 | Bowman et al. | |
| 8,883,392 B2 | 11/2014 | Napadensky et al. | |
| 8,921,446 B2 | 12/2014 | Nakatani et al. | |
| 9,303,123 B2 | 4/2016 | Kurata et al. | |
| 9,296,933 B2 | 5/2016 | Sherman et al. | |
| 9,534,151 B2 | 1/2017 | Fujimoto et al. | |

(Continued)

FOREIGN PATENT DOCUMENTS

CN 102746785 A 10/2012
CN 104292850 A 1/2015

(Continued)

OTHER PUBLICATIONS

Bayer MaterialScience, "The Chemistry of Polyurethane Coatings," 31 pages.
Cheng et al., "Surface functionalization of 3D-printed plastics via initiated chemical vapor deposition," Beilstein J Nanotechnol., 8:1629-1636 (2017).
Fouassier et al., "Dyes as photoinitiators or photosensitizers of polymerization reactions." Materials 3(12):5130-5142 (2010).
Hoyle et al., "Thiol-enes: Chemistry of the past with promise for the future," Journal of Polymer Science: Part A: Polymer Chemistry 42(21): 5301-5338 (2004).

(Continued)

Primary Examiner — Mohammad M Ameen
(74) Attorney, Agent, or Firm — Finnegan, Henderson, Farabow, Garrett & Dunner, LLP

(57) ABSTRACT

The present disclosure relates to the use of occluding fluids, such as a high-density fluid (a "z-fluid") or a low-density fluid (an "a-fluid"), to displace resin within a vat during 3D printing. Further, an a-fluid may act as a protective boundary for a 3D printing resin wherein the a-fluid sits on top of the printing resin. Another embodiment of the disclosure provides a process of assessing which regions of a computer-aided design (CAD) model take advantage of a buoying force supplied by the occluding fluid, such that fewer support structures are needed for printing a final CAD model compared to printing the CAD model without the occluding fluid.

20 Claims, No Drawings

(56) References Cited

U.S. PATENT DOCUMENTS

| | | |
|---|---|---|
| 9,559,073 B2 | 1/2017 | Tamura et al. |
| 9,623,268 B2 | 4/2017 | Cooke et al. |
| 2002/0037944 A1 | 3/2002 | Shen et al. |
| 2005/0029175 A1 | 2/2005 | Farr et al. |
| 2006/0025492 A1 | 2/2006 | Chauk |
| 2007/0261602 A1 | 11/2007 | Verborgt et al. |
| 2008/0289539 A1 | 11/2008 | Tazzia |
| 2009/0169872 A1 | 7/2009 | Krongauz et al. |
| 2010/0171393 A1 | 7/2010 | Pei et al. |
| 2011/0130489 A1 | 6/2011 | Williams |
| 2011/0186081 A1 | 8/2011 | Dunn et al. |
| 2011/0195237 A1 | 8/2011 | Patel et al. |
| 2011/0201717 A1 | 8/2011 | Held et al. |
| 2012/0157564 A1 | 6/2012 | Kurata |
| 2012/0202909 A1 | 8/2012 | Chen |
| 2012/0259031 A1 | 10/2012 | Dake et al. |
| 2015/0165678 A1 | 6/2015 | Ding et al. |
| 2015/0352788 A1 | 12/2015 | Livingston et al. |
| 2016/0024331 A1 | 1/2016 | Catena |
| 2016/0200044 A1 | 7/2016 | Voit et al. |
| 2017/0022414 A1 | 1/2017 | Boogaerts et al. |
| 2017/0028618 A1 | 2/2017 | Robeson et al. |
| 2017/0066936 A1 | 3/2017 | Lee et al. |
| 2017/0174827 A1* | 6/2017 | Gu ................ A61L 27/54 |
| 2017/0184959 A1 | 6/2017 | Honma et al. |
| 2017/0253780 A1 | 9/2017 | Wang et al. |
| 2017/0267804 A1* | 9/2017 | Ellson ............ C08G 18/1841 |
| 2017/0275430 A1 | 9/2017 | Kube et al. |
| 2017/0291357 A1 | 10/2017 | Fong et al. |
| 2018/0297281 A1 | 10/2018 | Baltaji et al. |
| 2020/0331207 A1* | 10/2020 | Liu ................ G06T 19/20 |
| 2021/0162656 A1* | 6/2021 | Beh ............... B29C 64/232 |

FOREIGN PATENT DOCUMENTS

| | | | |
|---|---|---|---|
| CN | 104842565 A | * | 8/2015 |
| CN | 104842565 A | | 8/2015 |
| JP | 2014005260 A | | 1/2014 |
| JP | 5475067 B2 | | 4/2014 |
| WO | WO 2017/048710 A1 | | 3/2017 |
| WO | WO 2017/109497 A1 | | 6/2017 |
| WO | WO 2017/151782 A1 | | 9/2017 |
| WO | WO-2018 005501 A1 | * | 1/2018 |
| WO | WO 2018/005501 A1 | | 1/2018 |
| WO | WO 2018/007579 A1 | | 1/2018 |
| WO | WO 2018/182536 A1 | | 10/2018 |

OTHER PUBLICATIONS

Hoyle et al., "Thiol-click chemistry: a multifaceted toolbox for small molecule and polymer synthesis," Chem. Soc. Rev., 39:1355-1387 (2010).
International Search Report for PCT/US2019/062598, dated Mar. 31, 2020.
Jin et al., "Kinetics of multifunctional thiol-epoxy click reactions studied by differential scanning calorimetry: effects of catalysis and functionality," Polymer 81: 70-78 (2015).
Koo et al., "Limitations of radical thiol-ene reactions for polymer-polymer conjugation," Journal of Polymer Science Part A: Polymer Chemistry 48(8): 1699-1713 (2010).
Leonards et al., "Advantages and drawbacks of Thiol-ene based resins for 3D-printing," *Laser 3D Manufacturing II*. vol. 9353. International Society for Optics and Photonics (2015).
Leonards et al., "Stereolithographic Processing and Biocompatibility of a Thiol-ene Based Resin."
Li et al., "The effect of thiol and ene structures on thiol-ene networks: Photopolymerization, physical, mechanical and optical properties," Polymer 50(10): 2237-2245 (2009).
Ligon et al., "Advanced applications of thiol-ene formulations" 2014 UV & EB Technical Conference Proceedings (2014).
Ligon et al., "Strategies to reduce oxygen inhibition in photoinduced polymerization." Chemical Reviews 114(1): 557-589 (2014).
Lowe, "Thiol-ene 'click' reactions and recent applications in polymer and materials synthesis," Polymer Chemistry 1(1): 17-36 (2010).
Matsushima et al., "Thiol-Isocyanate-Acrylate Ternary Networks by Selective Thiol-Click Chemistry," Journal of Polymer Science: Part A: Polymer Chemistry, 48:3255-3264 (2010).
Murofushi, "The characteristic of the secondary thiol compounds and its application." Corporate R&D Center, Showa Denko K.K., Kawasaki, Japan.
Nakayama et al., "Synthesis of novel UV-curable difunctional thiourethane methacrylate and studies on organic-inorganic nanocomposite hard coatings for high refractive index plastic lenses," Progress in Organic Coatings 62:274-284 (2008).
Northrop et al., "Thiol-ene click chemistry: computational and kinetic analysis of the influence of alkene functionality," Journal of the American Chemical Society 134(33): 13804-13817 (2012).
Pfeifer et al., "Delayed gelation through chain-transfer reactions: Mechanism for stress reduction in methacrylate networks," 52(15): 3295-3303, (2011).
Querat et al., "Blocked isyocyanate: Reaction and thermal behaviour of the toluene 2,4-diisocyanate dimer," Die Angewandte Makromolekulare Chemie, 242:1-36, (1996).
Rolph et al., "Blocked isocyanates: from analytical and experimental considerations to non-polyurethane applications," Poly. Chem., 7:7351-7364, (2016).
Rogulska et al., "New thermoplastic poly(thiourethane-urethane) elastomers based on hexane-1,6-diyl diisocyanate (HDI)," J Therm Anal Calorim, 114:903-916 (2013).
Sharmin et al., "Polyurethane: an introduction," Polyurethane: 3-16 (2012).
Walker et al., "Rapid, large-volume thermally controlled 3D printing using a mobile liquid interface," Science, 366(6463):360-364 (2019).
Wicks et al., "Blocked isocyanates III: Part A. Mechanisms and chemistry," Progress in Organic Coatings, 36:148-172, (1999).
Wicks et al., "Blocked isocyanates III: Part B. Uses and applications of blocked isocyanates," Progress in Organic Coatings, 41:1-83, (2001).
Written Opinion of the International Searching Authority for PCT/US2019/062598, dated Mar. 31, 2020.
Yao et al., "Kinetics based on the base-catalyzed mechanism of a click reaction between glycol dimercaptoacetate and glycidyl phenyl ether," *RSC advances* 7(18): 10881-10884 (2017).
Extended European Search Report, European Application No. 19887250.9-1103, dated Jul. 6, 2022, 9 pages.
First Office Action, Chinese Application No. 201980088354.7, dated Sep. 28, 2022, 13 pages.
Non-Final Office Action in U.S. Appl. No. 17/345,139, dated Oct. 26, 2023, 15 pages.
European Communication for Application No. 19 887 250.9-1103, dated Dec. 21, 2023, 27 pages.

\* cited by examiner

USING OCCLUDING FLUIDS TO AUGMENT ADDITIVE MANUFACTURING PROCESSES

CROSS-REFERENCE TO RELATED APPLICATIONS

This application is a U.S. national phase entry application under 35 U.S.C. 371 from PCT International Application No. PCT/US2019/062598, filed Nov. 21, 2019, which claims priority to U.S. Provisional Application No. 62/770, 403. filed Nov. 21, 2018, the contents of each application is incorporated herein by reference.

FIELD OF INVENTION

The present invention relates generally to the field of additive manufacturing, and more particularly to three-dimensional (3D) printing.

BACKGROUND

SLA and vat DLP use light to cause liquid resin to solidify into polymerized objects. While different light sources are used for SLA and DLP (lasers and LED light, respectively) and different dose rates are applied, the nominal dose used by each source to cure the resin is similar. These systems often employ: (1) a top-down printing method in which the part is cured by patterned light at a liquid-air interface, lowered, coated with another layer of resin and the process repeated; or (2) a bottom-up printing method in which patterned light is illuminated from the bottom of resin vat to cross-link the photo-resin layer by layer with the resin staying below an a-fluid.

In top-down printing, the part being lowered into a vat of resin may necessitate a large excess of resin being used in a typical print, often leaving 80 to 90% of the resin in the vat unreacted. Similarly, bottom-up printing may also require an excess of resin that remains unreacted. This excess resin may lead to added cost to fill a whole resin vat and pronounced aging, as the resin refresh rate is decreased as a percentage of the total resin.

Another challenge that may be encountered is that printing with high monomer content, low crosslink density resins may be challenging in top-down and bottom-up systems because the printed part is submerged in its own resin during the print. This resin, often comprised of monomers with molecular weights of <200 Da, tends to swell the printed part (due to normal molecular diffusion) and cause part distortion.

Another problem that may be encountered is that the printing of soft materials is often difficult because the initial printed state of the soft material is too weak to support its own weight. This may lead to requiring an exceptional number of supports or making printing the soft part infeasible. When printing a soft material part its own resin, each layer could polymerize, densify and, as the print progressed, the part could collapse upon itself, making the material unrecoverable from the printer.

Another problem that may be encountered is that some fluids may not be suitable for use in resin vats. For example, aqueous or small molecule alcohol based fluids (e.g., methanol, ethanol or propanol), formed from the addition of salts or organics (such as sugars) to water or alcohols (the solvent), may suffer from a number of drawbacks including: volatilization of the solvent leading to densification of the z-fluid and increased viscosity; interpolation of the solvent (small molecules) into the printing resin; interpolation of resin into the z-fluid (decreasing the z-fluid density and increasing the likelihood of an inversion event (where the resin and z-fluid switch places)); reactivity of the solvent towards nucleophiles (such as isocyanates in the printing resin); relatively low density compared to the resin (density differences of ~0.1 to 0.2) which can lead to resin/z-fluid inversions as described above Thus, there remains a need for improved three-dimensional (3D) printing resin methods to overcome any of the problems noted above.

SUMMARY

Some embodiments include a method for producing a three-dimensional object, comprising: (i) placing a liquid polymer resin and at least one occluding fluid in a vat; (ii) immersing a build table into the vat; (iii) depositing a layer of the liquid polymer resin on a surface of the build table; (iv) projecting light from a light-source to cure a portion of the resin layer; (v) depositing a new layer on the previously cured resin layer; (vi) projecting light from the light source to cure a portion of the newly deposited resin layer; and (vii) repeating steps (iii) through (vi) until the three-dimensional object is formed.

Some embodiments include a method for preparing a 3D printer to print, comprising: adding liquid polymer resin to a vat of a 3D printing apparatus, and adding an occluding fluid to the vat.

Some embodiments include a method for stabilizing 3D printer resin, comprising: preparing a liquid polymer resin; transferring the resin to a container; and adding at least one protective fluid to the container, wherein the protective fluid floats on the resin.

Some embodiments include a shelf-stable system for storing 3D printer resin, comprising: a container containing a liquid polymer resin and at least one protective fluid, wherein the at least one protective fluid and the liquid polymer resin form separate layered fluid phases, wherein the resin fluid layer resides in the container below the protective fluid layer.

Some embodiments include a method for cleaning an occluding fluid, comprising: (i) transferring an occluding fluid from a vat of a 3D printing apparatus to a tray, wherein the thickness of the layer of the occluding fluid in the tray is preselected; (ii) exposing the occluding fluid to light from a light-source; (iii) passing the light-treated occluding fluid through a physical filter; (iv) incubating the physically filtered occluding fluid in a vacuum oven; or (v) passing the thermally-treated occluding fluid through a chemical filter.

Some embodiments include a process of assessing which regions of a computer-aided design (CAD) model take advantage of a buoying force supplied by an occluding fluid, such that fewer support structures may be needed for printing a final CAD model compared to printing the CAD model without the occluding fluid, comprising the steps of: (a) determining the number and location of support structures in the CAD model to enable printing after reducing support structures in the CAD model, wherein the buoying force supplied by the occluding fluid is not taken into account, (b) determining the number and location of necessary support structures in the CAD model to enable printing of the CAD model, wherein the buoying force supplied by the occluding fluid is taken into account, and (c) generating the total support structure in a final CAD model by subtracting the support structures determined in step (a), and adding the support structures determined in step (b).

DETAILED DESCRIPTION

The present disclosure describes the use of occluding fluids, such as a high-density fluid (a "z-fluid") or a low-density fluid (an "a-fluid"), to displace resin within a vat during 3D printing.

One mode of printing includes one in which patterned light is illuminated upon a resin surface from above the resin surface commonly referred to as top-down printing, with the resin resting upon a z-fluid. The z-fluid is denser than the resin, and thus sinks below it and is immiscible in the resin. This form of printing is compatible with both top-down Digital Light Projection Vat Polymerization (commonly referred to as vat DLP or simply DLP) as well as Stereolithography (commonly referred to as SLA or SL).

In some embodiments, an occluding fluid may be used to reduce the amount of resin needed for a print, increase the resin refresh rate, and decrease resin aging (increased pot-life). The occluding fluid may also decrease the number of supports needed in the print and decreases the post processing time of the printed part. The decreased number of supports in the printed part may lead to a decreased post processing time as the time to clean a part is proportional to the number of defects (supports) on the part.

Increasing the resin refresh rate may be achieved by using a smaller amount of resin in the print bath available for the print. As the resin is consumed during the print, the residual resin is smaller than that which would normally be left if no z-fluid were used, increasing the refresh rate with respect to a system without z-fluid.

Decreased resin aging (increased pot life) is a function of the higher refresh rate, providing new un-aged resin into the vat. This new resin dilutes the aged (printed on) resin and forms a printing mixture which has lower viscosity compared to an aged resin without z-fluid.

Reduction in resin volume may be achieved by a high-density z-fluid or a low-density a-fluid that occludes volume which would otherwise be occupied by the printing resin. This occluded volume enables a vat to be filled to normal operating levels while reducing the overall amount of resin needed to perform a print by up to 95%.

Perfluorinated fluids, semi-fluorinated fluids, and semi-fluorinated fluids generally have a higher density compared to resins used for 3D printing. These fluorinated oils are compatible with a range of additive manufacturing chemistries including traditional radical-mediated chemistries (e.g., acrylate, methacrylate, and thiol-ene), as well as cationic and anionic chemistries. Fluorinated polymers are known for chemical inertness; they may be highly hydrophobic (and in many cases oleo-phobic); they may be thermally stable; and they may be stable to UV irradiation. Fluorinated oils, linear or lightly branched polymers with low glass transitions and low molecular weights, may retain these properties in a liquid form. As liquids, they generally exhibit low viscosity, high density, and a high boiling point. Specifically, the inertness of fluorinated oils make them suitable in z-fluids for nucleophilic chemistries (e.g., epoxy and isocyanate monomers). Examples of perfluorinated fluids may include perfluoropolyether (PFPE), perfluoroalkylether, (PFAE), and perfluoropolyalkylether (PFPAE) or mixtures thereof. In some cases, the perfluoropolyether is chosen from Fomblin®, Krytox™, and Demnum™.

One aspect of the disclosure provides a printing method for producing a three-dimensional object, comprising: (i) placing a liquid polymer resin and at least one occluding fluid in a vat; (ii) immersing a build table into the vat; (iii) depositing a layer of the liquid polymer resin on a surface of the build table; (iv) projecting light from a light-source to cure a portion of the resin layer; (v) depositing a new layer on the previously cured resin layer; (vi) projecting light from the light source to cure a portion of the newly deposited resin layer; and (vii) repeating steps (iii) through (vi) until the three-dimensional object is formed.

Another embodiment of the disclosure includes a method for preparing a 3D printer to print, comprising: adding liquid polymer resin to a vat of a 3D printing apparatus, and adding an occluding fluid to the vat. The resin may be added to the vat before or after one or more occluding fluid(s). The density of the at least one occluding fluid may be greater or less than the density of the liquid polymer resin.

In some cases, the at least one occluding fluid comprises a high-density z-fluid and/or a low-density a-fluid. In some cases, the density of the at least one occluding fluid is greater than the density of the liquid polymer resin. For example, the density of the composition may be greater than 1, 1.1, 1.2, 1.3, 1.4, 1.5, 1.6, 1.7, 1.8, 1.9, or 2. In some cases, the density of the at least one occluding fluid is lower than the density of the liquid polymer resin. For example, the density of the at least one occluding fluid may be less than 1, 0.9, 0.8, 0.7, 0.6, 0.5, 0.4, 0.3, 0.2, or 0.1.

In some cases, the average molecular weight of the occluding fluid may be greater than 50, 100, 200, 300, 400, 600, 800, 1000, 2000, 4000, 6000, 8000, 10000, 20000, 40000, or 60000 Da. Another aspect of the occluding fluid may include having a viscosity suitable for use in a resin vat. In some cases, the average viscosity of the composition at 20° C. is greater than 1, 5, 10, 20, 40, 60, 80, 100, 200, 400, 600, 800, 1000, 1200, 1400, 1600, 1800, 2000, 3000, 4000, 5000, 6000, 8000, 10000, or 20000 cP.

The occluding fluid may be chosen from an aliphatic oil, a silicone oil, and a fluorinated oil. In some instances, the occluding fluid is a perfluorinated fluid. Exemplary perfluorinated fluids include a perfluoropolyether (PFPE) (e.g. Fomblin®, Krytox™, and Demnum™), a perfluoroalkylether, (PFAE), and a perfluoropolyalkylether (PFPAE). In other instances, the occluding fluid is a semi-fluorinated fluid, such as semi-fluorinated polyether and semi-fluorinated silicone containing polymer. Further, the occluding fluid may comprise a mixture of a perfluorinated fluid; a semi-fluorinated fluid; and/or a semi-fluorinated silicone containing polymer fluid.

One aspect of the method is that it may be used in with resins of different monomer contents. For example, the monomer content of the liquid polymer resin may be greater than 30%, 35%, 40%, 45%, 50%, 55%, 60%, 65%, 70%, 75%, 80%, 85%, or 90%.

A low-density A-fluid may be used as an occluding fluid, such that it displaces space in the resin vat. An A-fluid may act as a protective boundary for a 3D printing resins wherein the A-fluid is lighter than the printing resin and sits on top of the resin. In some cases, the A-fluid is inert and has a low viscosity and a low density. The A-Fluid may be used to reduce diffusion of gaseous species into or out of the printing resin. For example, it may be desirable to reduce the amount of water vapor entering into a printing resin. A highly hydrophobic A-fluid would act as a barrier to this vapor and reduce the uptake of water in the printing resin. Conversely, a toxic and volatile chemical within the printing resin may be trapped beneath an A-fluid which serves as a diffusion barrier to the toxic substance diffusing out of the A-fluid.

In some cases, the occluding fluid is a hydrophobic oil. For example, the hydrophobic oil is chosen from, mineral oil, tung oil, vegetable oil, silicone oil, kerosene, animal oil, coal oil, anthracene oil, and mixtures thereof. In some cases, at least one occluding fluid is chosen from linear aliphatic alkanes, branched aliphatic alkanes, cyclized aliphatic alkanes, arenes, substituted arenes, linear aliphatic alkenes, branched aliphatic alkenes, cyclized aliphatic alkenes, aliphatic carboxylic acids, polyolefins and mixtures thereof.

In some cases, the occluding fluid has a vapor pressure at 20° C. which is less than 20, 18, 16, 14, 12, 10, 8, 6, 5, 4, 3, 2, 1, 0.5 or 0.1 mmHg. In some cases, the water vapor permeability through the occluding fluid is less than $1000 \times 10^{-11}$, $800 \times 10^{-11}$, $600 \times 10^{-11}$, $400 \times 10^{-11}$, $200 \times 10^{-11}$, $100 \times 10^{-11}$, $80 \times 10^{-11}$, $60 \times 10^{-11}$, $40 \times 10^{-11}$, $20 \times 10^{-11}$ $10 \times 10^{-11}$, $8 \times 10^{-11}$, $6 \times 10^{-11}$, $4 \times 10^{-11}$, $2 \times 10^{-11}$, $0.5 \times 10^{-11}$, $0.1 \times 10^{-11}$, $0.05 \times 10^{-11}$, $0.01 \times 10^{-11}$, $0.005 \times 10^{-11}$, or $0.0001 \times 10^{-11}$ $g \cdot m^{-1} \cdot s^{-1} \cdot Pa^{-1}$.

Generally, the occluding fluid may have low solubility with the resin used for additive manufacturing. In some cases, the occluding fluid and the liquid polymer resin are immiscible, such that they form separate layered fluid phases. In some cases, the solubility of the occluding fluid in the liquid polymer resin is less than 10, 5, 1, 0.5, 0.1, 0.08, 0.06, 0.04, 0.02, 0.01, 0.005, 0.001 g/L at 20° C. In some cases, the solubility of the liquid polymer resin in the occluding fluid is less than 10, 5, 1, 0.5, 0.1, 0.08, 0.06, 0.04, 0.02, 0.01, 0.005, 0.001 g/L at 20° C. In some cases, the occluding fluid and the liquid polymer resin form separate layered fluid phases.

The method may also comprise using a liquid polymer resin comprising at least one photobase generator, which may contribute to photo-induced polymerization and cross-linking of the resin. In some cases, at least one photobase generator is chosen from a Compound of Formula (I):

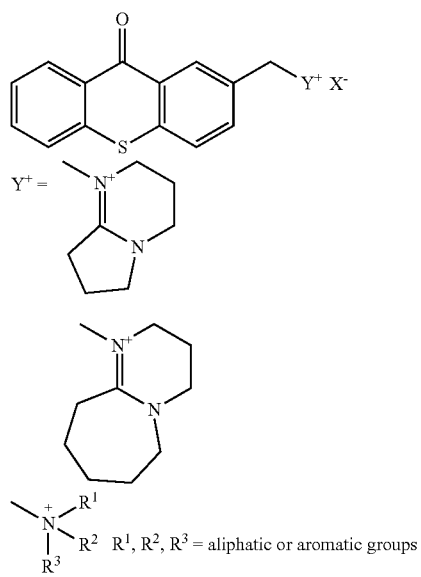

(1)

-continued

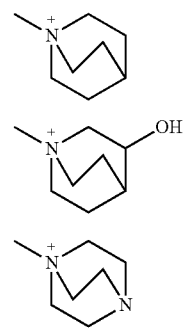

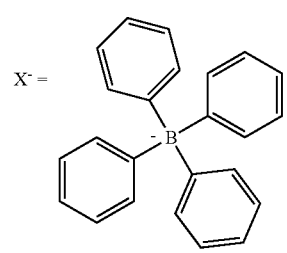

$X^- =$ $SbF_6^-$;

(I)

a Compound of Formula (II):

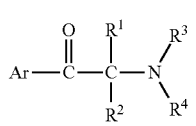

(2)

Ar = aromatic groups
$R^1, R^2, R^3, R^4$ = aliphatic or aromatic groups (II);

a Compound of Formula (III):

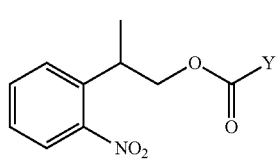

(3)

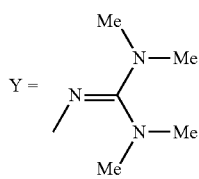

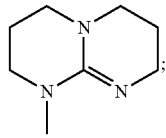

(III)

or a Compound of Formula (IV):

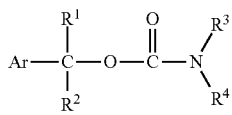

(4)

Ar = aromatic groups

R¹, R², R³, R⁴ = aliphatic or aromatic groups (IV).

The liquid polymer resin may further comprises at least one dye. In some cases, the at least one dye may be chosen from 2,5-bis(5-tert-butyl-benzoxazol-2-yl)thiophene; 2-(4-biphenylyl)-6-phenylbenzoxazole; 1,4-bis(5-phenyl-2-oxazolyl)benzene; 2,5-diphenyloxazole; coumarin 1; coumarin 6; coumarin 7; coumarin 30; coumarin 102; coumarin 314; coumarin 343 or 2,2'-methylenebis[6-(2H-benzotriazol-2-yl)-4-(1,1,3,3-tetramethylbutyl)phenol]; carbon black, titanium(IV) oxide, and zinc oxide.

The thickness of the occluding fluid in the resin vat can be varied. In some cases, the thickness of the layer of the occluding fluid in the vat is greater than 0.1, 0.5, 1, 2, 4, 6, 8, 10, 20, 40, 60, 80, 100, 200, 400, 600, 800, 1000, 2000, 4000, 6000, 8000, or 10000 mm. Additionally, thickness of the liquid polymer resin in the vat can be varied. For example, in some cases, the thickness of the layer of the liquid polymer resin in the vat is greater than 0.1, 0.5, 1, 2, 4, 6, 8, 10, 20, 40, 60, 80, 100, 200, 400, 600, 800, 1000, 2000, 4000, 6000, 8000, or 10000 mm.

Generally, the occluding fluid may help to remove excess resin from around the part during printing (thereby decreasing swelling of the printed part). The method may also be used with two or more occluding fluids. Where two or more occluding fluids are used, the densities of the occluding fluids differ from one another by more than 0.1, Further, the viscosities of the occluding fluids differ from one another by more than 0.1. In some cases, the addition of two or more occluding layers may be used to displace resin at different heights in the vat, including, for example, at the top or the bottom of the vat. This multi-stage, stacked approach of adding two or more occluding fluids with different densities may provide a means of removing excess liquid resin that sticks to the surface of a printed part; as each layer of the occluding fluid applies successively more force against that residual resin and more completely drives it off the part. This may effectively "clean" excess resin off the part as it is printed and keeps excess resin from interpolating into the printed part, which would tend to swell and, therefore, distort or weaken the part. In some cases, the densities of the occluding fluids differ from one another by more than 0.1. In some cases, the viscosities of the occluding fluids differ from one another by more than 0.1

The method can be customized to fill the resin vat with different relative amounts of the occluding fluid. In some cases, 0.1%, 0.5%, 1%, 5%, 10%, 20%, 30%, 40%, 50%, 60%, 70%, 80%, 90%, or 95% of the total vat volume is filled with the occluding fluid.

The method may be used to print 3D objects of various hardness values, including soft materials. Use of occluding fluids may, in some cases, enable the printing of ultra-soft materials because the occluding fluid may support the soft material and hold it in place during a 3D print. In some cases, the modulus of the 3D-printed object is less than 35, 30, 25, 20, 15, 10, 5, or 1 Shore A.

Another embodiment of the disclosure includes a method for stabilizing 3D printer resin, comprising: preparing a liquid polymer resin; transferring the resin to a container; and adding at least one protective fluid to the container, wherein the protective fluid floats on the resin.

Another embodiment of the disclosure includes shelf-stable system for storing 3D printer resin, comprising: a container containing a liquid polymer resin and at least one protective fluid, wherein the at least one protective fluid and the liquid polymer resin form separate layered fluid phases, wherein the resin fluid layer resides in the container below the protective fluid layer. In some cases, the container is a vat of a 3D printing apparatus.

As resin degrades over time, it may increase in viscosity. In some cases, the addition of at least one protective fluid may aid in preventing degradation, such that the viscosity of the resin does not increase by more than 1%, 5%, 10%, 25%, 50%, or 75% after 1, 5, or 10 day(s) on the shelf.

The protective layer may be an a-fluid that is layered on top of the resin. In some cases, the density of the protective layer is less than the density of the liquid polymer resin. For example, the density of the at least one protective fluid may be less than 1, 0.9, 0.8, 0.7, 0.6, 0.5, 0.4, 0.3, 0.2, or 0.1. The at least one protective fluid may be or include a hydrophobic oil. For example, the at least one protective fluid may be chosen from mineral oil, tung oil, vegetable oil, silicone oil, kerosene, animal oil, coal oil, anthracene oil, and mixtures thereof. In some cases, at least one protective fluid is chosen from linear aliphatic alkanes, branched aliphatic alkanes, cyclized aliphatic alkanes, arenes, substituted arenes, linear aliphatic alkenes, branched aliphatic alkenes, cyclized aliphatic alkenes, aliphatic carboxylic acids, polyolefins and mixtures thereof.

In some cases, the average molecular weight of the protective fluid may be greater than 50, 100, 200, 300, 400, 600, 800, 1000, 2000, 4000, 6000, 8000, 10000, 20000, 40000, or 60000 Da. Another aspect of the protective fluid may include having a viscosity suitable for use in a container. In some cases, the average viscosity of the composition at 20° C. is greater than 1, 5, 10, 20, 40, 60, 80, 100, 200, 400, 600, 800, 1000, 1200, 1400, 1600, 1800, 2000, 3000, 4000, 5000, 6000, 8000, 10000, or 20000 cP.

In some cases, the protective fluid has a vapor pressure at 20° C. which is less than 20, 18, 16, 14, 12, 10, 8, 6, 5, 4, 3, 2, 1, 0.5 or 0.1 mmHg. In some cases, the water vapor permeability through the protective fluid is less than 1000× $10^{-11}$, 800×$10^{-11}$, 600×$10^{-11}$, 400×$10^{-11}$, 200×$10^{-11}$, 100×$10^{-11}$, 80×$10^{-11}$, 60×$10^{-11}$, 40×$10^{-11}$, 20×$10^{-11}$, 10×$10^{-11}$, 8×$10^{-11}$, 6×$10^{-11}$, 4×$10^{-11}$, 2×$10^{-11}$, 1×$10^{-11}$, 0.5×$10^{-11}$, 0.1×$10^{-11}$, 0.05×$10^{-11}$, 0.01×$10^{-11}$, 0.005×$10^{-11}$, or 0.0001×$10^{-11}$ g·m$^{-11}$·s$^{-11}$·Pa$^{-11}$.

Generally, the protective fluid may have low solubility with the resin used for additive manufacturing. In some cases, the protective fluid and the liquid polymer resin are immiscible, such that they form separate layered fluid phases. In some cases, the solubility of the protective fluid in the liquid polymer resin is less than 10, 5, 1, 0.5, 0.1, 0.08, 0.06, 0.04, 0.02, 0.01, 0.005, 0.001 g/L at 20° C. In some cases, the solubility of the liquid polymer resin in the protective fluid is less than 10, 5, 1, 0.5, 0.1, 0.08, 0.06, 0.04, 0.02, 0.01, 0.005, 0.001 g/L at 20° C. In some cases, the protective fluid and the liquid polymer resin form separate layered fluid phases.

One aspect of the method is that it may be used in with resins of different monomer contents. For example, the monomer content of the liquid polymer resin may be greater than 30%, 35%, 40%, 45%, 50%, 55%, 60%, 65%, 70%, 75%, 80%, 85%, or 90%.

The method may also comprise using a liquid polymer resin comprising at least one photobase generator, which may contribute to photo-induced polymerization and cross-linking of the resin. In some cases, at least one photobase generator is chosen from a Compound of Formula (I):

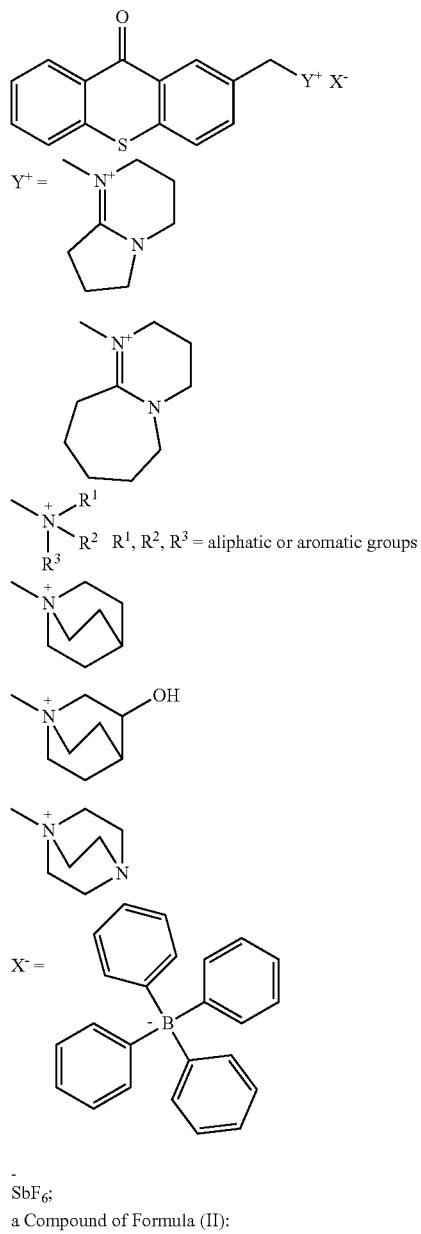

(I)

a Compound of Formula (II):

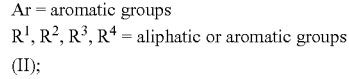

Ar = aromatic groups
$R^1, R^2, R^3, R^4$ = aliphatic or aromatic groups
(II);

a Compound of Formula (III):

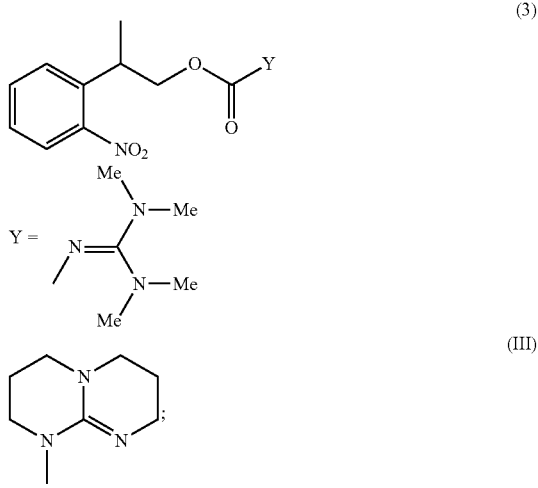

(3)

or
a Compound of Formula (IV):

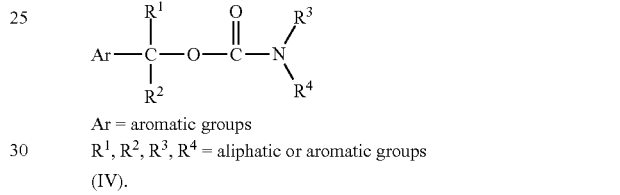

(4)

Ar = aromatic groups
$R^1, R^2, R^3, R^4$ = aliphatic or aromatic groups
(IV).

The liquid polymer resin may further comprises at least one dye. In some cases, the at least one dye may be chosen from 2,5-bis(5-tert-butyl-benzoxazol-2-yl)thiophene; 2-(4-biphenylyl)-6-phenylbenzoxazole; 1,4-bis(5-phenyl-2-oxazolyl)benzene; 2,5-diphenyloxazole; coumarin 1; coumarin 6; coumarin 7; coumarin 30; coumarin 102; coumarin 314; coumarin 343 or 2,2'-methylenebis[6-(2H-benzotriazol-2-yl)-4-(1,1,3,3-tetramethylbutyl)phenol]; carbon black, titanium(IV) oxide, and zinc oxide.

The thickness of the protective fluid in the container can be varied. In some cases, the thickness of the layer of the occluding fluid in the vat may be greater than 0.1, 0.5, 1, 2, 4, 6, 8, 10, 20, 40, 60, 80, 100, 200, 400, 600, 800, 1000, 2000, 4000, 6000, 8000, or 10000 mm. Additionally, thickness of the liquid polymer resin in the container can be varied. For example, in some cases, the thickness of the layer of the liquid polymer resin in the vat may be greater than 0.1, 0.5, 1, 2, 4, 6, 8, 10, 20, 40, 60, 80, 100, 200, 400, 600, 800, 1000, 2000, 4000, 6000, 8000, or 10000 mm. The method can be customized to fill the container with different relative amounts of the protective fluid. In some cases, 0.1%, 0.5%, 1%, 5%, 10%, 20%, 30%, 40%, 50%, 60%, 70%, 80%, 90%, or 95% of the total vat volume is filled with the protective fluid.

Another embodiment of the disclosure provides a method for cleaning an occluding fluid, comprising: (i) transferring an occluding fluid from a vat of a 3D printing apparatus to a tray, wherein the thickness of the layer of the occluding fluid in the tray is preselected; (ii) exposing the occluding fluid to light from a light-source; (iii) passing the light-treated occluding fluid through a physical filter; (iv) incubating the physically filtered occluding fluid in a vacuum oven; (v) passing the thermally-treated occluding fluid through a chemical filter. Thickness of the layer of the occluding fluid may be, for example, about 1 mm to 100 mm deep. In some cases, the occluding fluid is transferred using a peristaltic pump.

A light-source may be used to clean the occluding fluid is a UV light source. For example, the wavelength of the UV light source may be chosen from 254 nm, 365 nm, 385 nm, and 405 nm. In some cases, the distance between the light-source and the layer of the occluding fluid in the tray may be greater than 2, 4, 6, 8, 10, 12, 14, 16, 18, 20, 25, 30, 40, or 50 cm. In some cases, the output power of the light-source is greater than 10, 20, 30, 40, 50, 60, 70, 80, 90, 100, 110, 120, 130, 140, or 150 W/m². In some cases, the occluding fluid is exposed to the light-source for greater than 10, 20, 30, 40, 50, 60, 90, 120, 180, 240, 300, or 160 minutes.

The occluding fluid may be cleaned with a physical filter. In some cases, the physical filter captures particles greater than 2000, 1000, 900, 850, 800, 750, 500, 650, 600, 550, 500, 450, 400, 350, 300, 250, 200, 150, 100, 90, 80, 70, 60, 50, 40, 30, 20, 10, 5, or 1 µm in size.

The occluding fluid may be cleaned by incubating it in a vacuum oven. In some cases, the occluding fluid is incubated in the vacuum oven for 12 hours, under 10 mm Hg of pressure at 100° C.

The occluding fluid may be cleaned with a chemical filter. In some cases, the chemical filter is a carbon black filter.

Another embodiment of the disclosure provides a process of assessing which regions of a computer-aided design (CAD) model take advantage of a buoying force supplied by the occluding fluid, such that fewer support structures are needed for printing a final CAD model compared to printing the CAD model without the occluding fluid, comprising the steps of: (a) determining the number and location of support structures in the CAD model to enable printing after reducing support structures in the CAD model, wherein the buoying force supplied by the occluding fluid is not taken into account; (b) determining the number and location of necessary support structures in the CAD model to enable printing of the CAD model, wherein the buoying force supplied by the occluding fluid is taken into account, and (c) generating the total support structure in a final CAD model by subtracting the support structures determined in step (a), and adding the support structures determined in step (b).

EXAMPLES

Example 1. Shelf-Life Extension Experiment

One example using A-fluid assisted shelf-life extension of 3D printing resin was demonstrated using thiol-isocyanate resin. Due to the high reactive potential between the thiol and isocyanate functional groups, the resin composed of thiols and isocyanates may not demonstrate a robust shelf-life by itself. For example, the moisture in air may effectively catalyze the thiol-isocyanate reaction, which causes the resin to solidify. The shelf-life of thiol-isocyanate resin may be extended by adding a hydrophobic fluid layer, e.g. mineral oil, to the top of resin, which reduces the contact between moisture and thiol-isocyanate resin. This approach can be applied for vat photopolymerization in 3D printing.

A shelf-life extension experiment was conducted using 15 grams of thiol-isocyanate resin composed of 5 mol % of pentaerythritol tetrakis(3-mercaptopropionate) (PETMP), 95 mol % of 2,2'-(ethylenedioxy)diethanethiol (EDDT), and 100 mol % hexamethylene diisocyanate (HDI), which was prepared and separated into three equal weight portions in three glass vials respectively. One vial was top-sealed with 2 grams of mineral oil and another one was top-sealed with 2 grams of silicone oil. The three vials were placed in air and uncapped. After 2 days, the control vial (without top-sealing) was fully gelled, while the resins sealed by mineral oil and silicone oil were still clear liquid with some flocs. After 7 days, the resin covered by silicone oil was solidified. After 13 days, the resin covered by mineral oil was solidified. A follow-up experiment with same amount (5 grams) and same formulation (5 mol % PETMP, 95 mol % EDDT, and 100 mol % HDI) of resin and 5 grams of mineral oil as a-fluid on the top showed that the resin could last for 18 days before solidification. In conclusion, the silicone oil a-fluid extended the shelf-life of thiol-isocyanate by at least 250%, while the mineral oil a-fluid was able to extend the shelf-life of thiol-isocyanate by at least 800%.

Example 2. Use of Z-Fluids and A-Fluids in 3D Printing

During 3D printing, the polymer resin vat of the printing apparatus is supplemented with one or more occluding fluids, such as Z-fluids or A-fluids. The resin is added either before or after the occluding fluids. Polymer resins, such as isocyanate, thiol-isocyanate, alcohol-isocyanate, amine-isocyanate, mixed nucleophile-isocyanate, epoxy, thiol-epoxy, alcohol-epoxy, amine-epoxy, or mixed nucleophile-epoxy, radical, acrylate, methacrylate, or thiol-ene resin, are used. The occluded volume of resin comprises up to 95% of the total volume in the vat.

Upon initiating a printing protocol to make a 3D object, the 3D printing apparatus uses patterned light from the top or from the bottom to enable polymerization of the resin in layers. While the layers are printed, the occluding fluid removes excess resin from the 3D object when the occluding fluid meets the printed layers in the resin vat, resulting in a 3D-printed object.

What is claimed is:

1. A method for producing a three-dimensional object, comprising:
   (i) placing a liquid polymer resin and at least one occluding fluid in a vat;
   (ii) immersing a build table into the vat;
   (iii) depositing a layer of the liquid polymer resin on a surface of the build table;
   (iv) projecting light from a light source to cure a portion of the resin layer;
   (v) depositing a new layer on the previously cured resin layer;
   (vi) projecting light from the light source to cure a portion of the newly deposited resin layer; and
   (vii) repeating steps (iii) through (vi) until the three-dimensional object is formed,
   wherein the liquid polymer resin comprises at least one photobase generator selected from a compound of Formula (I):

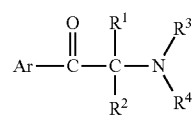

Ar = aromatic groups
$R^1, R^2, R^3, R^4$ = aliphatic or aromatic groups
(I);

-continued a compound of Formula (II):

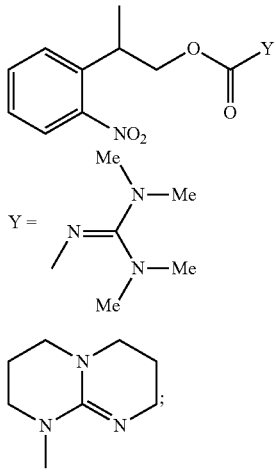

(II)

or
a compound of Formula (III):

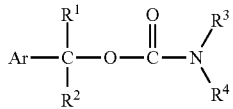

Ar = aromatic groups
$R^1, R^2, R^3, R^4$ = aliphatic or aromatic groups
(III).

2. The method according to claim 1, wherein the density of the at least one occluding fluid is greater than the density of the liquid polymer resin.

3. The method according to claim 1, wherein the density of the at least one occluding fluid is less than the density of the liquid polymer resin.

4. The method according to claim 3, wherein the at least one occluding fluid is a hydrophobic oil.

5. The method according to claim 4, wherein the hydrophobic oil is at least one of mineral oil, tung oil, vegetable oil, silicone oil, kerosene, animal oil, coal oil, or anthracene oil.

6. The method according to claim 3, wherein the at least one occluding fluid is at least one of a linear aliphatic alkane, a branched aliphatic alkane, a cyclized aliphatic alkane, an arene, a substituted arene, a linear aliphatic alkene, a branched aliphatic alkene, a cyclized aliphatic alkene, an aliphatic carboxylic acid, or a polyolefin.

7. The method according to claim 1, wherein the liquid polymer resin further comprises at least one dye.

8. The method according to claim 1, wherein placing the at least one occluding fluid in the vat comprises placing two or more occluding fluids in the vat.

9. The method according to claim 8, wherein the densities of the occluding fluids differ from one another by more than 0.1 c/cm$^3$.

10. The method according to claim 1, wherein at least 0.1% of the total vat volume is filled with the occluding fluid.

11. The method according to claim 1, wherein the at least one occluding fluid is an aliphatic oil, a silicone oil, or a fluorinated oil.

12. The method according to claim 1, wherein the at least one occluding fluid is a perfluorinated fluid.

13. The method according to claim 12, wherein the perfluorinated fluid is a perfluoropolyether (PFPE), a perfluoroalkylether (PFAE), or a perfluoropolyalkylether (PFPAE).

14. The method according to claim 1, wherein the at least one occluding fluid is a semi-fluorinated fluid.

15. The method according to claim 14, wherein the semi-fluorinated fluid is semi-fluorinated polyether or a semi-fluorinated silicone-containing polymer.

16. The method according to claim 1, wherein the at least one occluding fluid comprises a mixture of a perfluorinated fluid; a semi-fluorinated fluid; and/or a semi-fluorinated silicone-containing polymer fluid.

17. The method according to claim 1, wherein the density of the at least one occluding fluid is greater than 1 q/cm$^3$.

18. The method according to claim 7, wherein the at least one dye is chosen from 2,5-bis(5-tent-butyl-benzoxazol-2-yl)thiophene; 2-(4-biphenylyl)-6-phenylbenzoxazole; 1,4-bis(5-phenyl-2-oxazolyl)benzene; 2,5-diphenyloxazole; coumarin 1; coumarin 6; coumarin 7; coumarin 30; coumarin 102; coumarin 314; coumarin 343; 2,2'-methylenebis[6-2H-benzotriazol-2-yl)-4-(1,1,3,3-tetramethylbutyl)phenol]; carbon black; titanium (IV) oxide; or zinc oxide.

19. The method of claim 1, wherein the monomer content of the liquid polymer resin is greater than 30%.

20. The method according to claim 1, wherein at least one of the solubility of the occluding fluid in the liquid polymer resin at 20° C. or the solubility of the liquid polymer resin in the occluding fluid at 20° C. is less than 10 g/L.

* * * * *

UNITED STATES PATENT AND TRADEMARK OFFICE
CERTIFICATE OF CORRECTION

PATENT NO. : 11,911,956 B2
APPLICATION NO. : 17/295218
DATED : February 27, 2024
INVENTOR(S) : Benjamin Robert Lund et al.

It is certified that error appears in the above-identified patent and that said Letters Patent is hereby corrected as shown below:

In the Claims

Claim 9, Column 14, Line 9, "c/cm$^3$" should read as --g/cm$^3$--.

Claim 17, Column 14, Line 33, "q/cm$^3$" should read as --g/cm$^3$--.

Claim 18, Column 14, Lines 35-36, "2,5-bis(5-tent-butyl-benzoxazol-2-yl)thiophene;" should read as --2,5-bis(5-tert-butyl-benzoxazol-2-yl)thiophene;--.

Signed and Sealed this
Seventh Day of May, 2024

Katherine Kelly Vidal
*Director of the United States Patent and Trademark Office*